Oct. 11, 1955

O. C. WALLEY 2,720,571

CARBON PILE REGULATOR

Filed Feb. 4, 1955

INVENTOR.
OMAR C. WALLEY
BY
ATTORNEY

Oct. 11, 1955  O. C. WALLEY  2,720,571
CARBON PILE REGULATOR
Filed Feb. 4, 1955  2 Sheets-Sheet 2
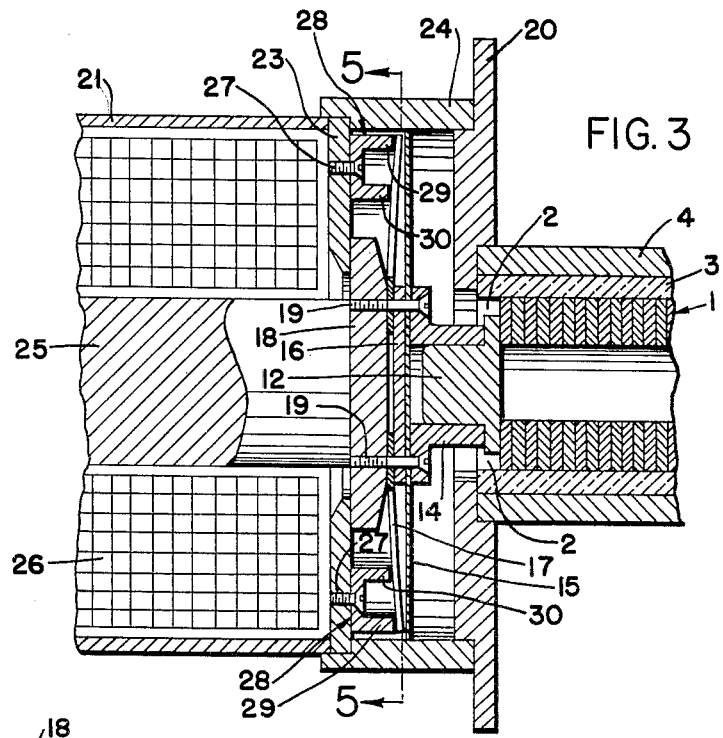
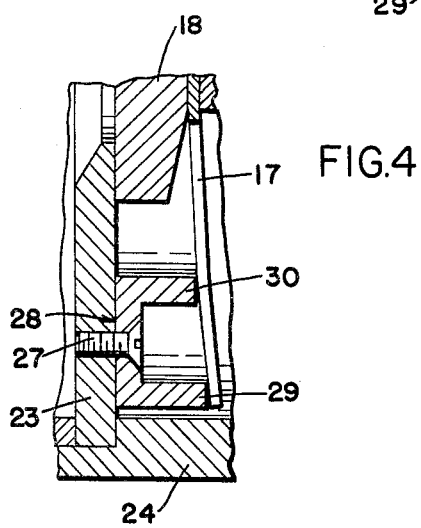
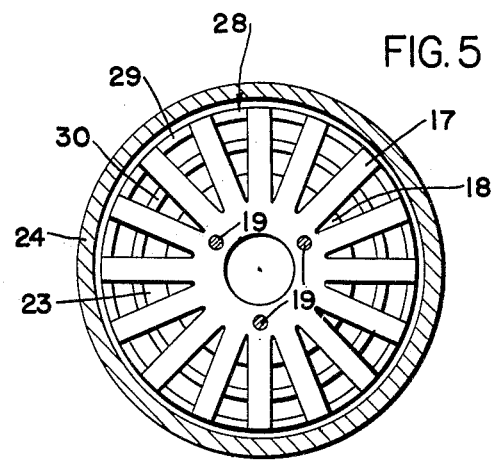
INVENTOR.
OMAR C. WALLEY
BY
ATTORNEY United States Patent Office 2,720,571
Patented Oct. 11, 1955

2,720,571

CARBON PILE REGULATOR

Omar C. Walley, Cleveland, Ohio, assignor to Jack & Heintz, Inc., Cleveland, Ohio, a corporation of Delaware Application February 4, 1955, Serial No. 486,092

8 Claims. (Cl. 201—51)

This invention relates in general to electromagnetic regulators and more particularly to voltage regulators of the carbon pile type.

In carbon pile regulators, and especially the type used in electrical accessories for aircraft, an electromagnet is employed which provides a force that varies substantially as the square of the voltage being regulated. This magnet force is opposed by resilient spring means. The difference in the operating force of the electromagnet and that of the resilient spring means is applied as a varying compressive force against the stack of assembled carbon discs axially of their common supporting means for varying the air gaps between the adjacent flat surfaces of the carbon discs. The forces created by the electromagnet are preferably approximately equal to those of the opposing resilient spring means and are approximately twenty times the forces actually applied to the stack of carbon pile discs.

Thus, it will be seen that the spring force should closely approximate the magnet force. The magnet force varies inversely as the square of the magnet air gap. Therefore, for proper operation of the carbon pile regulator, a spring having a non-linear force deflection characteristic is required. However, due to such factors as friction, hysteresis, required variable carbon pile force and adjustment procedure, I have found it preferable to employ a spring whose force does not exactly equal the magnet pull curve. In other words, I prefer to employ a spring that has spring characteristics that deviate from the square low force deflection curve.

I am aware of the two types of carbon pile regulators disclosed in United States Letters Patent to Newton, 2,268,718, of January 6, 1942, and Newton, 2,363,612, of November 28, 1944. In the disclosures of both of these patents there is a linear portion, followed by a non-linear portion. The linear portion is obtained by the spring acting as a simple cantilever type prior to the end of the spring becoming tangent to the inclined abutment in Newton, 2,268,718, or tangent to the other spring in Newton, 2,363,612. Up to this point, the active length of the spring is constant. After the spring wrapping action starts to take place, the lever arm of the spring is shortened so as to cause an increase in the force rate of the spring. This results in a second non-linear portion of the spring force curve following the first linear portion.

One of the primary objects of my invention is to provide a carbon pile regulator spring having a spring force deflection curve consisting in a plurality of successive step-by-step linear portions, as distinguished from a linear portion followed by a non-linear portion of different spring rates, or stiffness.

Another object is to provide such an assembly wherein a single spring may be employed as the only spring element and without the use of inclined abutments or opposing springs.

A further object is to provide in such an assembly a deflection ring against which bears a single spring so assembled that the deflection ring will provide a plurality of radially spaced fulcrum points for the spring in its deflection, due to axial compression, so as to cause the assembly to have a force deflection curve having a plurality of successive linear portions of different spring rates, or stiffness.

With the foregoing and other objects in view, the invention resides in the combination of parts and in the details of construction hereinafter set forth in the following specification and appended claims, certain embodiments thereof being illustrated in the accompanying drawings, in which:

Figure 3 is a view similar to Figure 2, showing the spring deflected to be resting on the inner rim of the ring as a fulcrum;

Figure 4 is an enlarged sectional view, showing the spring deflected to be resting on the inner rim of the ring as a fulcrum; and Figure 5 is a view in section taken along line 5—5 of Figure 3, showing the spring in elevation resting on the ring.

Figure 1:
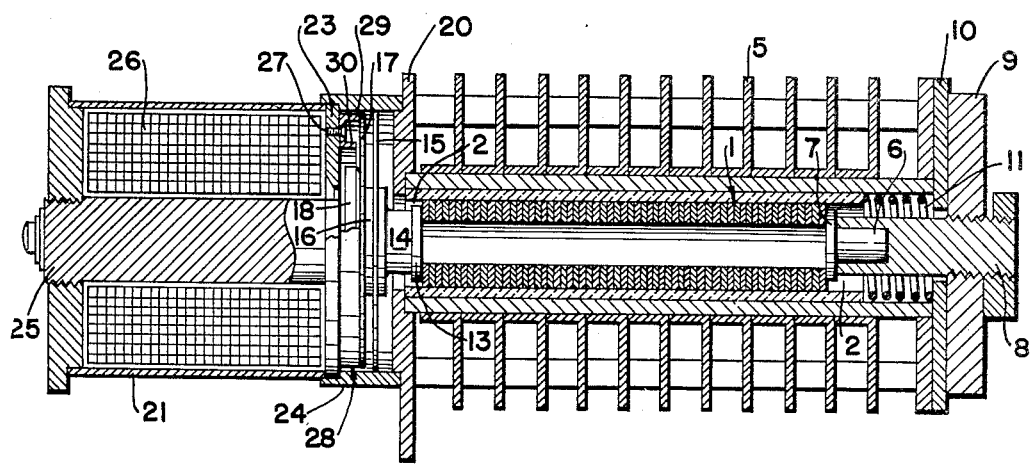
Figure 1 is a view in longitudinal section taken through a carbon pile embodying the principles of my invention.

Referring more particularly to the drawings, Figure 1 shows a carbon pile regulator including a stack of carbon discs 1 disposed within the bore of an insulating tube 3 that is slidable in metal tube 4, about which latter are disposed cooling radiating fins 5. Near the right end of the assembly an end button 6, having a contact flange 7, and fitting in a countersunk hole in the inner end of a screw plug 8 that screws into an end plate 9 and extends with clearance through an insulation ring 10. Between ring 10 and tube 3 is interposed a compression coil spring 11 for assembly purposes. At the left end of the stack is a second contact button 12, having a contact flange that bears on the left side of the stack 1 opposite flange 7. The left end of contact button 12 is fitted in an insulation support 14. Arranged to the left of insulation support 14, there may be employed a light centering spring 15, if desired. There is shown a plate 16, a radially multi-pronged flat centrally apertured spring 17 and a magnetic armature 18, all held in assembly as an axially floating unit by screw bolts 19 to comprise an armature assembly. The spring 11 urges tube 3 against the end wall 20.

The electromagnet assembly may be of conventional construction to include a side wall 21 and end walls 22 and 23. A side wall 24 bridges the axial space between end walls 20 and 23. The electromagnet assembly also includes a core 25 surrounded by an energizing winding 26. To the end wall 23 is secured by bolts 27 a ring 28 with an outer axially extending rim 29 and a radially inwardly spaced axially extending rim 30, the rim 29 extending axially to the right a slightly greater distance than the inner rim 30. These two ring rims 29 and 30 form a two-step fulcrum for the deflection of regulator spring 17. It is to be understood that I may similarly provide two, three or more, of such fulcrum rims.

Figure 2:
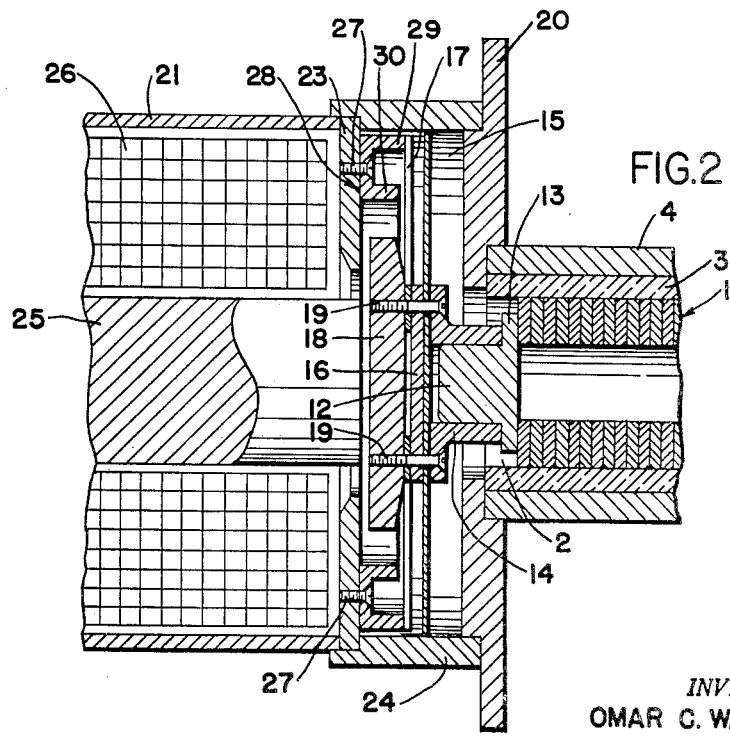
Figure 2 is a similar view of an enlarged portion thereof showing the spring resting on the outer rim of the ring as a fulcrum.

As shown in Figures 1 and 2, the radial leaves 17' of regulator spring 17 are initially forced against outer rim 29 of ring 28 and in axially spaced relation to the inner rim 30. Consequently, when the regulator spring is deflected under magnet pull, the spring is deflected in using the outer ring rim 29 as an initial outer fulcrum to give the first a linear portion of a deflection force curve. After a predetermined continuance of magnet pull, the regulator spring 17 bends to engage the inner ring rim 30, using the latter as an inner deflection fulcrum to give a succeeding portion of a linear deflection force curve. As stated previously, this magnet pull is opposed by the regulating spring 17, itself.

It will thus be seen that after the initial deflection, where the spring rests on the outer rim 29, or the outer fulcrum, as shown in Figures 1 and 2, the spring will then engage the inner rim 30, or the inner fulcrum, as it is further deflected, as shown in Figures 3 and 4. This change in operation of the spring from the outer to the inner fulcrum causes the active lever arm of the spring to become decreased so as to change the spring rate. By arranging the spring thickness, the desired spring rates, or stiffness, may be obtained for both linear portions of the deflection force curve. Moreover, I accomplish this by the use of a single spring and without the necessity of opposing springs or specially designed sloping abutments with critical angle slopes.

I claim:

1. In an electric regulator including a variable resistance carbon pile disc assembly, an electromagnet assembly including an armature, a spring carried by said armature to resist magnet pull and apply axial pressure on said carbon pile, a fulcrum member against which said spring rests, said member having a plurality of radially spaced fulcrum elements to be successively engaged as successive fulcrums by said spring step-by-step during continued progressive magnet pull deflection of said spring.

2. In an electric regulator including a variable resistance carbon pile disc assembly, an electromagnet assembly including an armature, a spring carried by said armature to resist magnet pull and apply axial pressure on said carbon pile, a fulcrum member against which said spring rests, said member having a plurality of radially spaced fulcrum elements of different axial lengths to be successively engaged as successive fulcrums by said spring step-by-step during continued progressive magnet pull deflection of said spring.

3. In an electric regulator including a variable resistance carbon pile disc assembly, an electromagnet assembly including an armature, a spring carried by said armature to resist magnet pull and apply axial pressure on said carbon pile, a fulcrum member against which said spring rests, said member having a plurality of radially spaced fulcrum elements to be successively engaged as successive fulcrums by said spring step-by-step during continued progressive magnet pull deflection of said spring to produce a deflection force curve consisting in a plurality of successive linear portions of different spring rates, or stiffness.

4. In an electric regulator including a variable resistance carbon pile disc assembly, an electromagnet assembly including an armature, a spring carried by said armature to resist magnet pull and apply axial pressure on said carbon pile, a fulcrum member against which said spring rests, said member having a plurality of radially spaced fulcrum elements of different axial lengths to be successively engaged as successive fulcrums by said spring step-by-step during continued progressive magnet pull deflection of said spring to produce a deflection force curve consisting in a plurality of successive linear portions of different spring rates, or stiffness.

5. In an electric regulator including a variable resistance carbon pile disc assembly, an electromagnet assembly including an armature, a spring carried by said armature to resist magnet pull and apply axial pressure on said carbon pile, a fulcrum member against which said spring rests, said member having two radially spaced fulcrum elements of different axial lengths to be successively engaged as successive fulcrums by said spring step-by-step during continued progressive magnet pull deflection of said spring.

6. In an electrical regulator including a housing and a variable resistance carbon pile disc assembly, an electromagnet assembly having an armature and operatively connected to said carbon pile disc assembly, a single spring having a plurality of radially extending fingers and carried by said armature, a stationary ring carried by said housing and having an outer rim and a radially spaced inner rim, both of said rims extending axially toward said spring, the outer rim being axially longer than said inner rim, the spring being assembled to initially engage the outer rim and under deflection of magnet pull, resisted by the spring, to initially use the outer rim as an outer fulcrum to produce a linear portion of a force deflection curve and, after a predetermined continued deflection, under magnet pull, to engage said inner rim as an inner fulcrum to produce a second linear portion of a deflection force curve consisting in successive linear portions of different spring rates, or stiffness.

7. In an electrical regulator including a housing and a variable resistance carbon pile disc assembly, an electromagnet assembly having an armature and operatively connected to said carbon pile disc assembly, a single spring carried by said armature, a stationary ring carried by said housing and having radially spaced inner and outer rims extending axially toward said spring, the outer rim being axially longer than said inner rim, the spring being assembled to initially engage the outer rim and under deflection of magnet pull, resisted by the spring, to initially use the outer rim as an outer fulcrum to produce a linear portion of a force deflection curve and, after a predetermined continued deflection, under magnet pull, to engage said inner rim as an inner fulcrum to produce a second linear portion of a deflection force curve consisting in successive linear portions of spring rates, or stiffness.

8. In an electrical regulator including a housing and a variable resistance carbon pile disc assembly, an electromagnet assembly having an armature and operatively connected to said carbon pile disc assembly, a spring carried by said armature, a stationary ring carried by said housing and having radially spaced rims extending axially toward said spring, the spring being assembled to initially engage the relatively radially outwardly disposed rim and under deflection of magnet pull, resisted by the spring, to initially use the relatively radially outwardly disposed rim as an outer fulcrum to produce a linear portion of a force deflection curve and, after a predetermined continued deflection, under magnet pull, to engage said inner rim as an inner fulcrum to produce a second linear portion of a deflection force curve consisting in successive linear portions of spring rates, or stiffness.

No references cited.